United States Patent
Covington et al.

(10) Patent No.: US 7,275,357 B2
(45) Date of Patent: Oct. 2, 2007

(54) COTTON MODULE PROGRAM CONTROL USING YIELD MONITOR SIGNAL

(75) Inventors: Michael J. Covington, Bettendorf, IA (US); Jesse H. Orsborn, Port Byron, IL (US); Dwight D. Lemke, Geneseo, IL (US)

(73) Assignee: CNH America LLC, New Holland, PA (US)

( * ) Notice: Subject to any disclaimer, the term of this patent is extended or adjusted under 35 U.S.C. 154(b) by 248 days.

(21) Appl. No.: 11/093,856

(22) Filed: Mar. 30, 2005

(65) Prior Publication Data

US 2005/0217510 A1    Oct. 6, 2005

Related U.S. Application Data

(60) Provisional application No. 60/557,886, filed on Mar. 30, 2004.

(51) Int. Cl.
*A01D 46/08* (2006.01)
(52) U.S. Cl. .......................... 56/28; 56/10.2 R; 56/11.2
(58) Field of Classification Search .................... 56/28, 56/10.2 R, 10.2 A, 11.2
See application file for complete search history.

(56) References Cited

U.S. PATENT DOCUMENTS

| | | | |
|---|---|---|---|
| 4,072,242 A * | 2/1978 | Cook | 414/505 |
| 4,744,207 A | 5/1988 | Hanley et al. | 56/16.6 |
| 4,888,940 A * | 12/1989 | Deutsch | 56/16.6 |
| 5,529,537 A | 6/1996 | Johnson | 460/6 |
| 5,533,932 A * | 7/1996 | Covington et al. | 460/119 |
| 5,551,218 A | 9/1996 | Henderson et al. | 53/504 |
| 5,584,762 A | 12/1996 | Buhler et al. | 460/119 |
| 5,768,872 A | 6/1998 | Von Allwörden | 56/341 |
| 5,770,865 A * | 6/1998 | Steffen et al. | 250/577 |
| 5,784,871 A | 7/1998 | Glancey et al. | 56/327.1 |
| 5,913,801 A | 6/1999 | Böttinger et al. | 56/10.2 R |
| 6,176,779 B1 | 1/2001 | Riesterer et al. | 460/119 |
| 6,366,210 B2 * | 4/2002 | Lemke | 340/665 |
| 6,530,199 B1 * | 3/2003 | Covington et al. | 56/16.6 |
| 6,536,197 B1 * | 3/2003 | Covington et al. | 56/28 |
| 6,616,527 B2 | 9/2003 | Shinners et al. | 460/6 |
| 6,651,416 B2 | 11/2003 | Trelstad et al. | 56/341 |

* cited by examiner

*Primary Examiner*—Thomas B. Will
*Assistant Examiner*—Jamie L McGowan
(74) *Attorney, Agent, or Firm*—Michael G. Harms; John William Stader

(57) ABSTRACT

A control and method for a cotton module building program for an on-board cotton module builder of a cotton harvester, which utilizes a signal or output from a yield monitor as a factor in determining and varying cotton module building parameters, which can include auger direction and duration of operation, compactor positions and compacting strokes for best compacting a cotton module under the yield conditions. A module complete signal which can be a visual or audio signal, can be outputted when the yield monitor detects a predetermined cotton module weight, for signaling approach of a required unloading of a cotton module.

12 Claims, 3 Drawing Sheets

COTTON MODULE PROGRAM CONTROL USING YIELD MONITOR SIGNAL

This application claims the benefit of U.S. Provisional Application No. 60/557,886, filed Mar. 30, 2004.

TECHNICAL FIELD

This invention relates generally to control of a process for compacting and building a cotton module, and more particularly, to control of a cotton module building process using a yield monitor signal.

BACKGROUND ART

With an on-board cotton module builder or packager parameters such as, but not limited to, the distribution of cotton within the module building chamber, the number of packing positions, and the number of compacting strokes, are all critical factors in forming a good rectangular module of compacted cotton that can be unloaded onto the ground as a stand alone module of cotton, and subsequently handled for transportation to the gin for processing. As is known, the distribution of the cotton within the module chamber is typically accomplished using augers attached to a compactor frame of compactor apparatus movable upwardly and downwardly in the chamber. During the compacting cycle, the augers are operated in a forward and/or reverse direction for distributing the cotton under the compactor apparatus. The number of packing positions is used to index or move the location of the compactor apparatus up within the chamber as the module is built from the bottom up. This ensures that there is space under the compactor in which to distribute the cotton. The number of packing strokes is the number of times that the cotton is pressed downwardly and compacted and more packing strokes ensures a good tight, cohesive module of cotton. The length of time that the augers run in the different directions, the number of packing positions, and the number of compaction strokes before raising or indexing the compactor apparatus to the next position are typically dependent upon set values that have been written in the electronic compaction program and stored in the compactor controller. These values are based on time, pressure, or both and are dependent on the amount of cotton that is coming into the module chamber. Under what are considered to be high yield conditions, generally three or more bales per acre, the amount of time the augers run forward and the amount of time they run rearward is different than under what is considered to be low yield conditions, one bale per acre. The number of compactor positions and compacting strokes are different in high yield cotton versus low yield cotton. Therefore, all of these values in the cotton compaction program that are used to produce a good rectangular module of cotton are dependent upon the yield that is being harvested.

The use of yield monitors on cotton pickers is common. Typically, yield monitors are used to measure the cotton being harvested and display the results on a monitor in yield, that is, bales per acre, and weight, typically in pounds.

What is sought is a control for a cotton module building process which can vary various parameter thereof, including, but not limited to, the time that the augers run forward or reverse, the number of packing positions, and the number of compaction strokes before raising the compactor apparatus, as a function of yield, to optimize module building and build better modules.

SUMMARY OF THE INVENTION

What is disclosed is a control for a cotton module building program which utilizes a signal or output from a yield monitor as a factor in determining and varying parameters which can include, but are not limited to, auger direction and duration of operation, compactor positions, and compacting stroke for best compacting the module under the yield conditions. As a result, more uniform cotton modules will be built under a variety of crop conditions.

Also, a module complete signal, such as a light or audio signal, can be outputted when the yield monitor detects a predetermined weight. For instance, typically a module from an on-board module builder will weigh as much as 11,000 pounds. As the weight of the cotton being harvested approaches this value, a light or alarm could be outputted for informing the operator that the time for unloading is approaching.

DETAILED DESCRIPTION OF THE INVENTION

Figure 1:
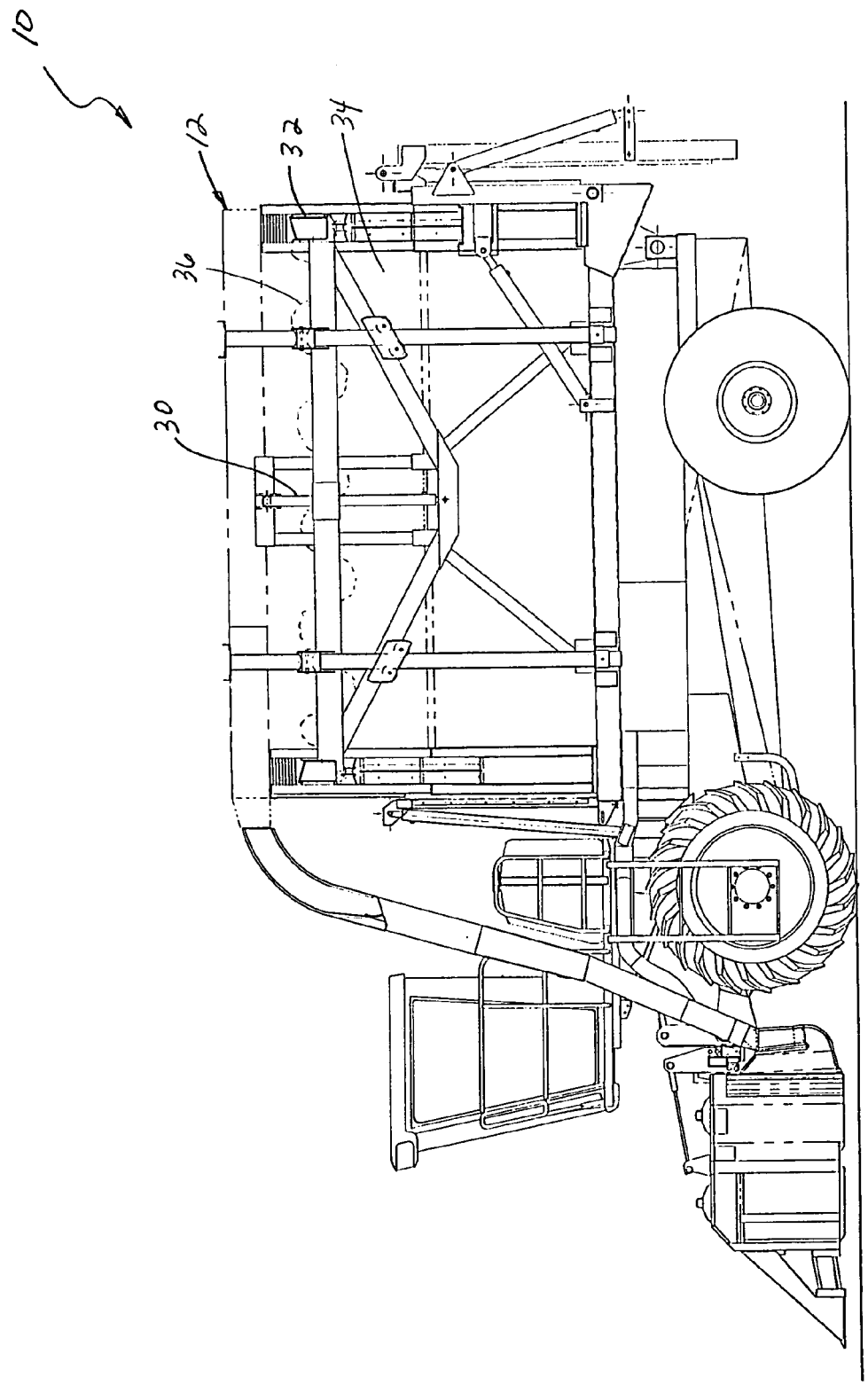
FIG. 1 is a side view of a cotton harvester including an on-board cotton module builder.

Turning now to the drawings, in FIG. 1, a cotton harvester 10 is shown, including an on-board cotton module builder 12 for compacting cotton harvested by harvester 10 into a unitary cotton module (not shown) according to the invention.

Figure 2:
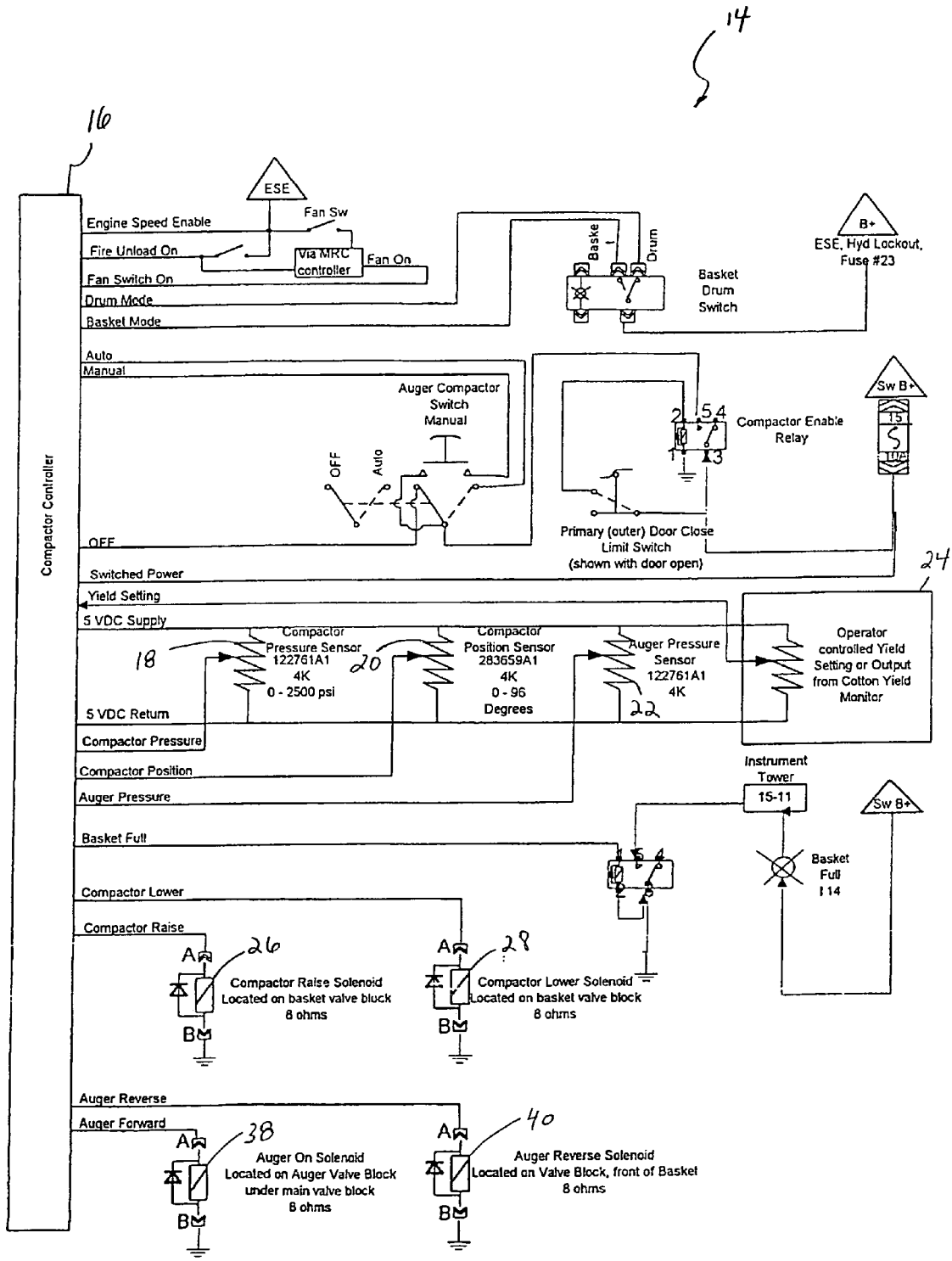
FIG. 2 is a schematic diagram of a cotton module builder control operable using a yield monitor signal according to the invention.

Referring also to FIG. 2, circuitry of a compactor control 14 operable according to the present invention is shown. Control 14 includes a compactor controller 16 operable for receiving signals outputted by a number of devices, including, but not limited to, a compactor pressure signal from a compactor pressure sensor 18, a compactor position signal outputted by a compactor position sensor 20, an auger pressure signal outputted by an auger pressure sensor 22, and a yield signal outputted by an operator controlled yield setting or a cotton yield monitor 24. Responsive to the signals from these devices, and/or other devices, controller 16 is operable for automatically responsively outputting signals to apparatus such as a compactor raise solenoid 26 and a compactor lower solenoid 28, which control compactor drivers, such as fluid cylinders 30 of module builder 12 (FIG. 1) operable for moving compactor apparatus 32 of module builder 12 upwardly and downwardly against cotton accumulated in a bottom region of a compactor chamber 34 of module builder 12. The drivers can also be used for setting or indexing the compactor position. Compactor control 14 is also operable for outputting signals to augers 36 (FIG. 1) of compactor apparatus 32, for effecting forward or reverse rotation thereof via an auger on solenoid 38 and an auger reverse solenoid 40.

Figure 3:
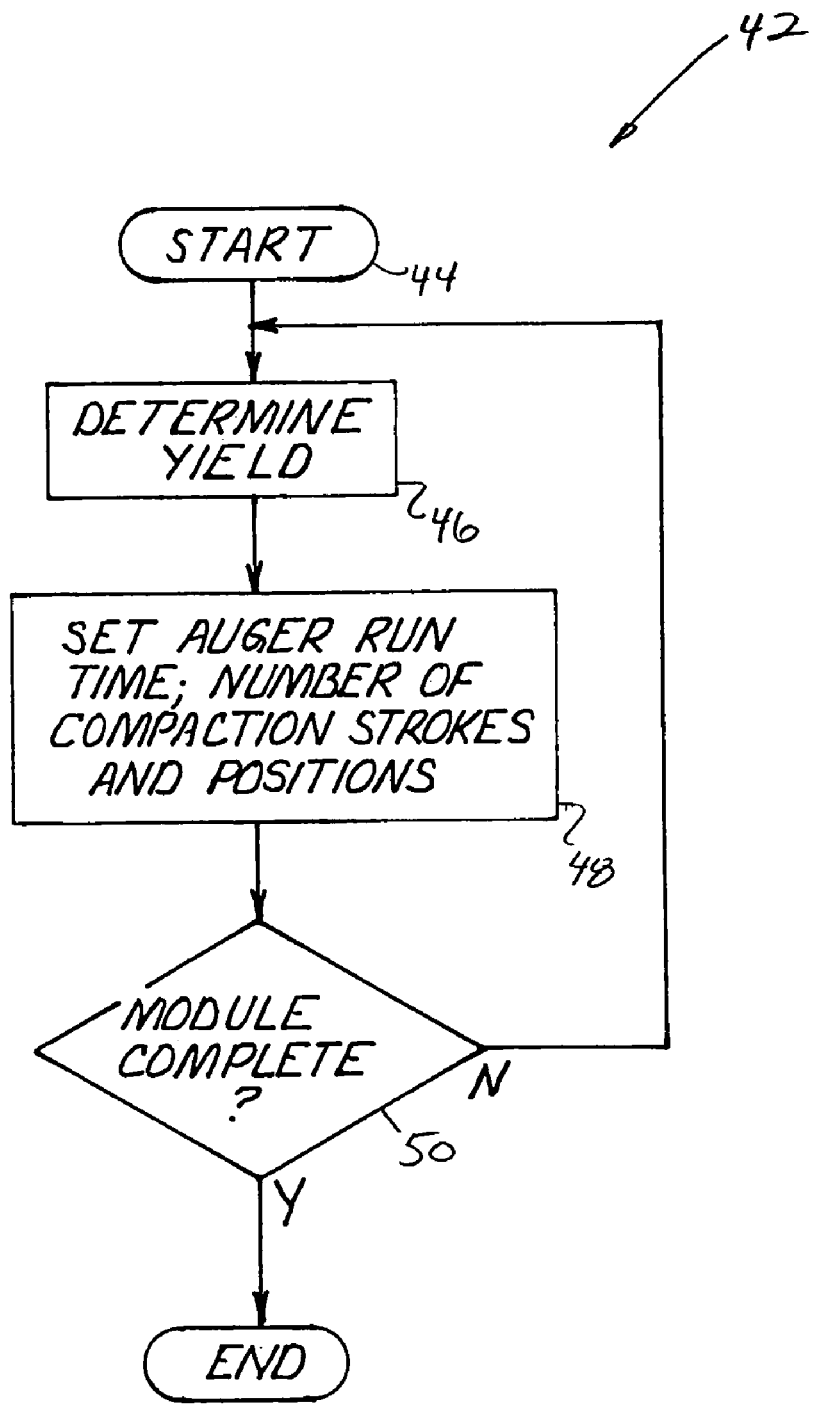
FIG. 3 is a high level flow diagram showing steps for operation of the control according to the invention.

Referring also to FIG. 3, a high level flow diagram 42 is shown, including steps for operation of compactor control 14 using yield monitor signals. After start block 44, control 14 will determine the cotton yield based on signals from cotton yield monitor 24, as denoted at block 46. Control 14 will set parameters such as, but not limited to, the auger run time, direction of operation, and number of compaction strokes, and the positions of compactor apparatus 32 within compactor chamber 34, as denoted at block 48. As the module building process proceeds, compactor control 14 will either cycle through the steps of blocks 46-48, if conditions for module complete block 50 are not satisfied, or end the module routine if conditions for module complete block 50 are satisfied and the module is complete. As noted above, as the module nears completion, for instance, when the module exceeds a predetermined weight, compactor control 14 can output a module complete signal, such as a light or an audio signal, to alert the operator.

As a result, as a function of detected yield values, compactor control 14 can vary the duration and direction of auger operation, number and height of compaction positions, and time at each position, and compacting stroke characteristics such as frequency, speed and length, as functions of the yield conditions. Thus, although yield conditions are varied, the different cotton modules produced will have uniform characteristics one relative to the other, including density, dimensions and shape.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method of operation of an on-board cotton module builder of a cotton harvesting machine, comprising steps of:
   determining a value representative of a cotton yield as a function of a signal outputted by a cotton yield monitor during a compaction cycle and as long as the conditions for a complete module block have not been satisfied;
   determining a run time for an auger for distributing cotton within the module builder, at least partially as a function of the determined value;
   determining a number of compaction strokes of a cotton compactor of the module builder, at least partially as a function of the determined value; and
   setting the position of the cotton compactor within a compactor chamber of the cotton module builder, at least partially a function of the determined value.

2. The method of claim 1, comprising a further step of outputting a module complete signal when a cotton module being built by the module builder is complete.

3. The method of claim 2, wherein a module being built by the module builder is determined to be complete when the module exceeds a predetermined weight.

4. The method claim 1, comprising a step of determining a direction of operation of the auger at least partially as a function of the determined value.

5. A method of operation of an on-board cotton module builder of a cotton harvesting machine, comprising steps of:
   providing a controller operable for controlling direction of rotation and run time for an auger for distributing cotton within the module builder and a number of compaction strokes of a cotton compactor of the module builder; and
   determining a run time for the auger for distributing cotton within the module builder and a number of compaction strokes of the cotton compactor bused at least in part on a yield setting inputted to time controller, the yield setting is inputted to the controller during the compaction cycle and only as long as the conditions for a complete module block have not been satisfied, wherein the controller is operable for determining compacting positions for the cotton compactor as a function of the yield setting.

6. The method of claim 5, wherein the yield setting is operator controlled.

7. The method of claim 5, wherein the yield setting is determined at least in part by a cotton yield monitor.

8. The method of claim 5, wherein the controller is operable for determining and changing directions of operation of the auger as a function of the yield setting.

9. The method of claim 5, wherein the controller is operable for varying a frequency of the compaction strokes of the cotton compactor as a function of the yield setting.

10. The method of claim 5, wherein the controller is operable for varying lengths of the compaction strokes of the cotton compactor as a function of the yield setting.

11. A method of operation of an on-board cotton module builder of a cotton harvesting machine, comprising steps of;
    varying duration and direction of rotation of an auger for distributing cotton within the module builder, as a function of yield conditions during a compaction cycle wherein the conditions for a complete module block have not been satisfied;
    varying a number and a duration of compaction strokes of a cotton compactor of the module builder, as a function of yield conditions during a compaction cycle wherein the conditions for a complete module block have not been satisfied; and
    setting the position of the cotton compactor within a compacting chamber of the cotton module builder, as a function of yield conditions during a compaction cycle wherein the conditions for a complete module block have not been satisfied.

12. The method of claim 11, comprising a further step of outputting a module complete signal when a cotton module being built by the module builder is complete or nearly complete.

* * * * *